United States Patent
Hayasaka

(10) Patent No.: US 6,945,703 B2
(45) Date of Patent: Sep. 20, 2005

(54) OPTICAL CONNECTOR

(75) Inventor: Daisuke Hayasaka, Yonezawa (JP)

(73) Assignee: Yonezawa Electric Wire Co., Ltd., Yamagata-ken (JP)

( * ) Notice: Subject to any disclaimer, the term of this patent is extended or adjusted under 35 U.S.C. 154(b) by 221 days.

(21) Appl. No.: 10/403,258

(22) Filed: Apr. 10, 2003

(65) Prior Publication Data

US 2004/0028343 A1 Feb. 12, 2004

(30) Foreign Application Priority Data

May 22, 2002 (JP) ........................................ 2002-148307

(51) Int. Cl.$^7$ ................................................ G02B 6/38
(52) U.S. Cl. ............................ 385/60; 385/72; 385/78
(58) Field of Search ...................................... 385/53–95

(56) References Cited

U.S. PATENT DOCUMENTS

| | | | | |
|---|---|---|---|---|
| 5,028,114 A | * | 7/1991 | Krausse et al. | 385/58 |
| 5,852,694 A | * | 12/1998 | Kimura et al. | 385/78 |
| 6,086,265 A | * | 7/2000 | Kuribayashi et al. | 385/92 |
| 2002/0126959 A1 | * | 9/2002 | Keselman et al. | 385/55 |

FOREIGN PATENT DOCUMENTS

| | | | |
|---|---|---|---|
| EP | 0 045271 | 2/1982 | |
| EP | 0 780 710 A2 | 6/1997 | |
| EP | 0 780 710 A2 | * 6/1997 | ............ G02B/6/38 |
| JP | 61-129605 | 6/1986 | |
| JP | 4-247414 | 9/1992 | |
| JP | 2000-155237 | 6/2000 | |
| JP | 2000-221365 | 8/2000 | |
| JP | 2002-31743 | 1/2002 | |
| JP | 2002-006174 | 1/2002 | |

* cited by examiner

*Primary Examiner*—Michelle R. Connelly-Cushwa
(74) *Attorney, Agent, or Firm*—Scully, Scott, Murphy & Presser

(57) ABSTRACT

When connecting an optical connector to an optical connector adaptor, there is a demand to position the optical connector with high precision with maintaining connection workability. In the optical connector of this invention has a key for positioning the optical connector around an axis of the optical connector adaptor by inserting the key into a key groove of the optical connector adaptor, and a spring structure which can elastically deform in the groove width direction of the key groove. Therefore, unsteadiness of the key can be prevented by pressingly inserting the key into the key groove, increasing the precision of the positioning. Furthermore, since a difference in the groove width of the key groove can be absorbed by the range of elastic deformation of the key, the optical connector is universally applicable for differences in groove widths depend on the type of the optical connector adaptor.

5 Claims, 6 Drawing Sheets

OPTICAL CONNECTOR

BACKGROUND OF THE INVENTION

1. Field of the Invention

This invention relates to an optical connector, such as an FC optical connector defined in Japanese Industrial Standard (JIS) C 5970, for performing positioning around an axial direction at the time of connection to a receive-side optical connector, such as an optical connector adaptor.

2. Description of the Related Art

FIG. 7 shows one example of the constitution of a conventional optical connector of this type (in this example, an FC optical connector). The optical connector 1 comprises a substantially cylindrical frame 2, a sleeve-like stopper 3 which is connected to the frame 2, a boot 4 which is attached to the stopper 3, a coupling nut 6 in which the frame 2 is rotatably inserted through, a spring 7 which is accommodated inside the frame 2, and a ferrule 8 which is inserted through the frame 2. In addition, the stopper 3, the boot 4, and holding parts incorporated inside the stopper 3, comprises a holding section 5 which holds an unillustrated optical fiber in which the top thereof being stored in the ferrule 8, and prevents the moving backward of the optical fiber from the optical connector 1 (to the left of FIG. 7).

The ferrule 8 forms a cylindrical shape with a flange section 9 at its rear end, and has four meshing grooves 10 provided in the outer peripheral face of the flange section 9 at intervals of 90 degrees. The meshing grooves 10 are shaped so as to mesh with meshing pieces 11, protruding to the inside of the frame, in order to position the ferrule 8 when it is inserted through the frame 2, and consequently, after centering (also termed "adjusting") as explained later, the meshing grooves 10 are selectively inserted and engaged with the meshing pieces 11, thereby achieving positioning of the ferrule 8 around an axial direction.

The ferrule 8 can move slightly along the axial direction with the meshing pieces 11 and meshing grooves 10 meshed together, and compresses the spring 7 when the ferrule 8 is pushed toward the rear side of the optical connector 1. The spring 7 generates a thrusting force against the ferrule which faces the other ferrule when two optical connectors are connected. Furthermore, an unillustrated stopper stops the ferrule 8 from flying out of the frame 2 toward the front of the optical connector 1.

A male screw section 12 is provided at the rear side of the outer peripheral face of the frame 2; a female screw section 13 is provided in the rear side of the coupling nut 6 and engages with the male screw section 12. In this example, the female screw section 13 is provided in the inner peripheral face of an inwardly-protruding section 14 at the rear side of the coupling nut 6. Furthermore, the inner diameter of the coupling nut 6 at the tip side thereof is sufficiently larger than the outer diameter of the frame 2; a female screw section 15 is provided in the inner peripheral face of the tip side of the coupling nut 6, and engages with a male screw section which is provided in the outer peripheral face of a sleeve section 22a (see FIG. 9) of an optical connector adaptor 22 which will be explained later.

A bump 16 is provided in the outer peripheral face of the frame 2 nearer to the tip side than the male screw section 12. The bump 16 extends along the rim of the frame 2, contacts the protruding section 14 of the coupling nut 6 with a washer 17 therebetween, and prevents the coupling nut 6 from slipping out of the frame 2.

A key ring 18 is attached over the outer peripheral face of the frame 2 nearer to the tip side than the bump 16. As shown in FIG. 8, the key ring 18 is made of resin or metal, and has a key ring main body 19, which has been made discontinuous by cutting a notch therein, a positioning projection 20 (hereinafter termed "key") which extends along one side of the key ring main body 19, and a pair of projections 21, which extend along the opposite side of the key ring main body 19. The projections 21 and the key 20 are provided at a right-angled position along the rim of the key ring 18.

The key ring 18 of this constitution is engaged and provided over the frame 2, by facing the lips 21 (not shown in FIG. 7) to the bump 16 side, so that the key 20 faces the tip side of the frame 2. The projections 21 of the key ring 18 engage with engagement portions (not shown in figure), provided in the bump 16 or the outer peripheral face of the frame 2, thereby positioning the key ring 18 around the axis of the frame 2; and then, the key ring 18 is fixed on the frame 2 by using an adhesive or the like. The key 20, which faces the tip side of the frame 2, engages with a key groove 23 of the optical connector adaptor 22 (see FIG. 9), and positioning the optical connector 1 and the optical connector adaptor 22.

When, for example, a pair of optical connectors 1 of this constitution are connected on both sides of a conventional optical connector adaptor 22, as shown in FIG. 9, the thrusting connection between the ferrules 8 optically connects the optical fibers of the optical connectors 1. That is, to connect the optical connectors 1 to the optical connector adaptor 22, the frame 2 and ferrule 8 of each optical connector 1 are inserted into the sleeve section 22a of the optical connector adaptor 22, the key 20 of the key ring 18 is inserted and engaged with the key groove 23 of the optical connector adaptor 22, and the coupling nut 6 of the optical connector 1 is screwed into the male screw section of the sleeve section 22a (see FIG. 9) of the optical connector adaptor 22. Consequently, the ferrules 8 which are held in position inside the frames 2 of the optical connectors 1, connected via the optical connector adaptor 22, and are thrust together and precisely positioned and connected on the same straight line by a positioning mechanism such as a positioning sleeve inside the optical connector adaptor 22. Furthermore, the positioning of each ferrule 8 of the optical connectors 1 around the axis thereof is performed by engaging the keys 20 of the key rings 18 with the key grooves 23 of the optical connectors 1.

In this type of optical connector 1, the position of the optical fiber (more specifically, the core of the optical fiber) which is securely inserted into the ferrule 8 is adjusted (more specifically, its position with respect to the frame 2 is adjusted) and centered so as to keep connection loss sufficiently low. In this case, the frame 2 and the optical fiber inside the ferrule 8 are centered by, for example, adjusting their relative positions by using a monitor device so that the meshing grooves 10 of the flange section 9 meshes with the meshing pieces 11 of the frame 2, and minimizing the connection loss between the optical fibers when the optical connectors 1 and 1 are connected via the optical connector adaptor 22. When the optical connectors 1 assembled in this manner are connected via the optical connector adaptor 22, the optical fibers which are securely inserted into the ferrules 8 of the optical connectors 1 are thrustingly connected with low connection loss.

When this type of optical connector 1 is used in connecting a PMF (Polarization-Maintaining optical Fiber, PANDA elliptical-clad, PANDA: Polarization-maintaining AND Absorption-reducing fiber), or when an APC (Angled Phase Contact) polished-type ferrule is used, and in other such cases, the optical connected must be positioned with high precision; however, due to specifications dependent on the manufacturer, the type of ferrule, and the like, the size of the key of the optical connector 1 may be different from the size (groove width) of the key groove of the optical connector adaptor 22 which in the optical connector 1 is to be connected to, making it necessary to carefully select the optical connectors and optical connector adaptor to be used; this is inconvenient.

Furthermore, the dimensions of the key groove of the optical connector adaptor and the key of the optical connector are held to closer tolerances in order to increase the positioning precision at the time of connection. However, this requires ultra-precise machining, and the cost of which exceeds the cost of the optical connector.

In addition, in the case of an FC-type optical connector, the optical connector is fastened to the optical connector adaptor by screwing (the screwing of the coupling nut as described above); when there is a slight clearance between the key and the key groove (i.e. when high positioning precision is not required), the rotation of the screw (coupling nut) at the time of attaching and removing the optical connector to and from the optical connector adaptor causes the key to move in the key groove. Since this may adversely affect the optical fiber and the ferrule, such as by damaging the tip of the optical fiber which is exposed at the top of the ferrule, there is a demand for techniques to reliably prevent such damage.

SUMMARY OF THE INVENTION

This invention has been provided in consideration of the above mentioned problems, and aims to provide an optical connector which can be positioned with high precision when connected to an optical connector on the receiving side of an optical connector adaptor or the like, and can maintain connection workability.

In order to achieve the above objects, the optical connector of this invention comprises a cylindrical-shaped frame; and a ferrule which is accommodated inside the frame and has controlled axial rotation with respect to the frame. The frame and the ferrule are inserted into a receive-side optical connector such as an optical connector adaptor, and a key which is provided on the frame is inserted and engaged with a key groove of the receive-side optical connector, thereby connecting the optical connector to the receive-side optical connector and achieving positioning of the optical connector around an axis of the receive-side optical connector. Furthermore, in this invention, the key has a spring structure which enables to vary the dimension of the key in the width direction corresponding to the groove width direction of the key groove by elastic deformation.

In this case, the key comprises a protruding piece which protrudes from a key ring which is provided around the frame, for example. In addition, the key ring can be rotated around an axis of the frame for positioning of the key ring, and can be fastened to the frame after the positioning.

Incidentally, in addition to the optical connector adaptor, "receive-side optical connector" refers to any type of optical connector in which the optical connector of this invention can be connected to, such as an optical receptacle; and there are no limitations on the constitution so long as the key groove is provided for the positioning of the optical connector around the axis by inserting the key of the optical connector into the key groove.

DESCRIPTION OF THE PREFERRED EMBODIMENTS

Figure 1:
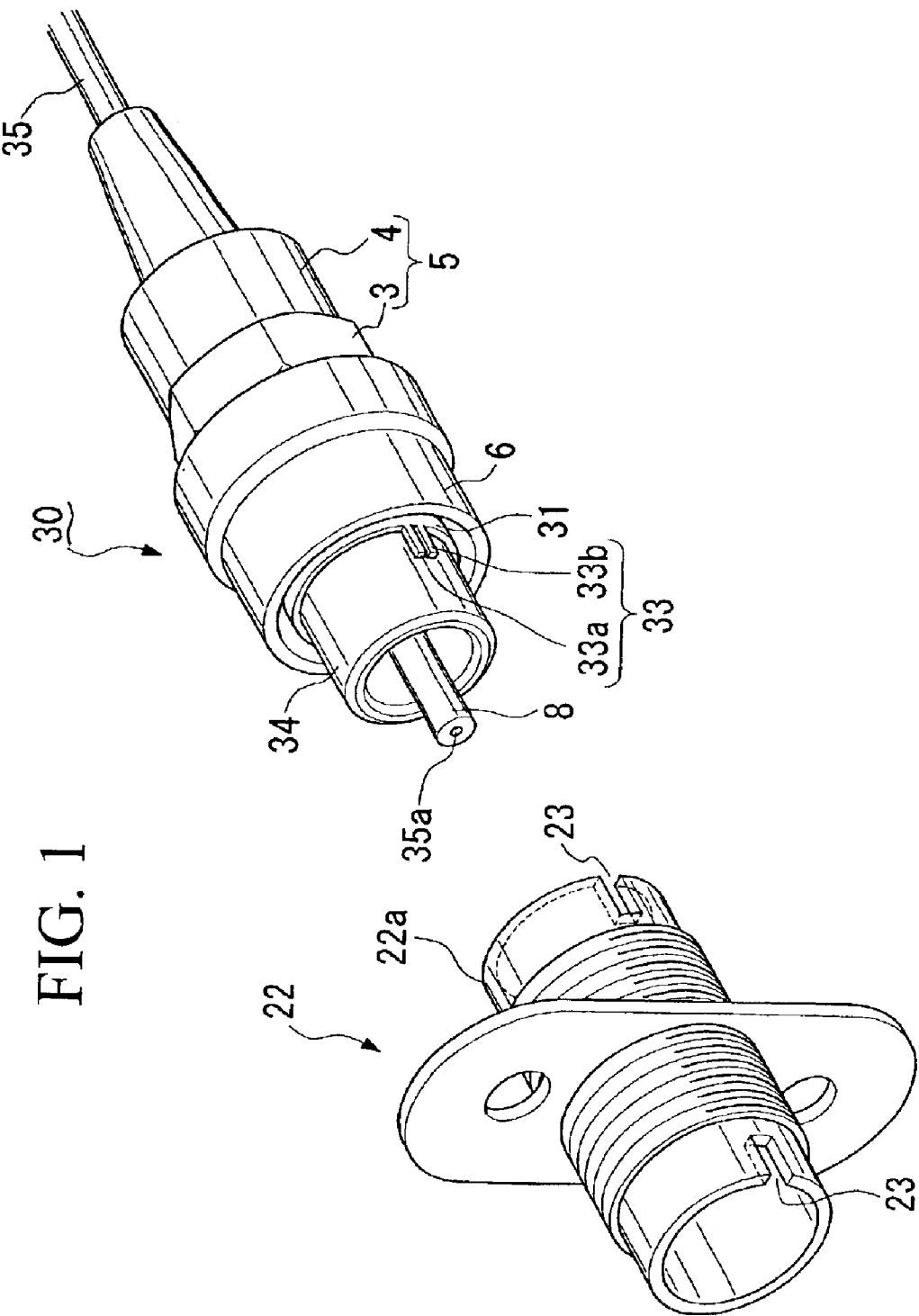
FIG. 1 is a perspective view of an embodiment of the optical connector of this invention.

The preferred embodiments will be presented in the following with reference to the figures. Those parts that are the same or similar to the conventional parts are given the same reference numerals.

Figure 2:
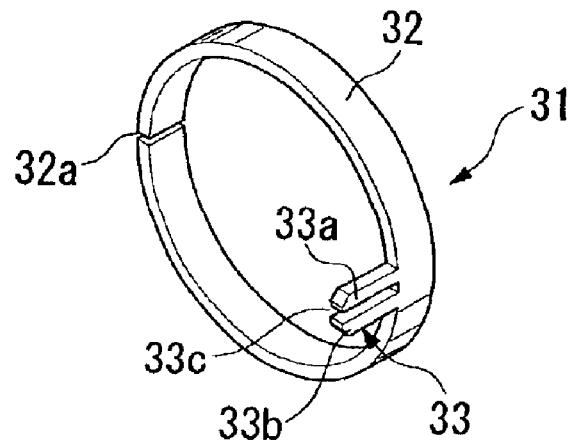
FIG. 2 is a perspective view of a key ring in the optical connector shown in FIG. 1.

FIG. 1 is a diagram showing an embodiment of an optical connector of this invention. In FIG. 1, reference numeral 30 represents the optical connector. The optical connector 30 differs from the optical connector 1 shown in FIG. 7 mainly in respect of the constitution of its key ring. As shown in FIG. 2, a key ring 31 of the optical connector 30 of this embodiment is a metal component comprising a key ring main body 32, which has been made discontinuous by cutting a notch (this notch is represented by reference numeral 32a), and a protruding key 33 (hereinafter termed "key") which extends along one side of the key ring main body 32. However, a pair of projections 21 of the conventional key ring 18 shown in FIG. 8 are omitted from this constitution. According to this type of constitution, at the time of assembling the optical connector 30, the key ring 31 is provided around the outer peripheral face of a frame 34, and can be positioned by rotating it around the axis of the frame 34. After the key ring 31 has been positioned by rotating it around the frame 34 in this way, it is fastened to the frame 34 by using an adhesive or the like.

Figure 7:
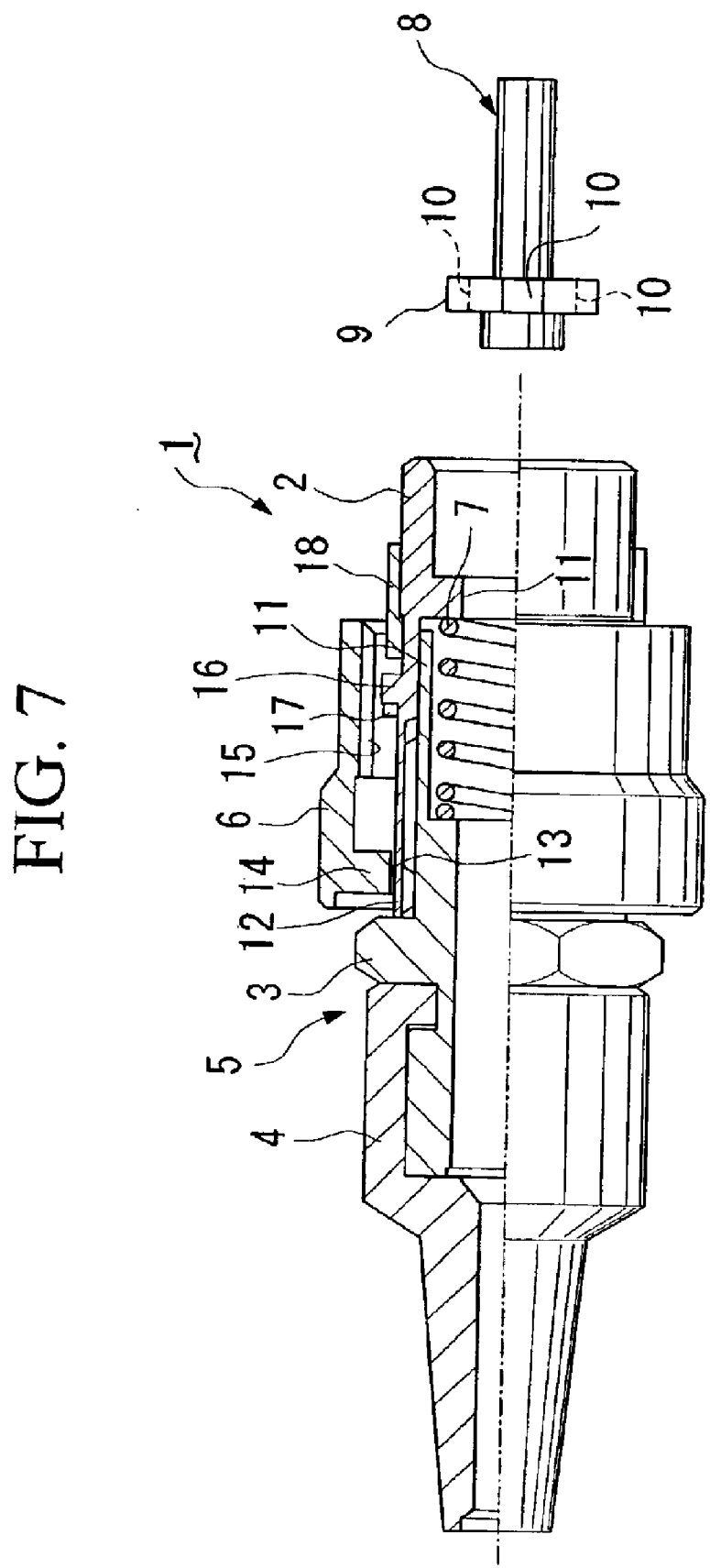
FIG. 7 is a side cross-sectional view of an example of a conventional optical connector.
Figure 8:
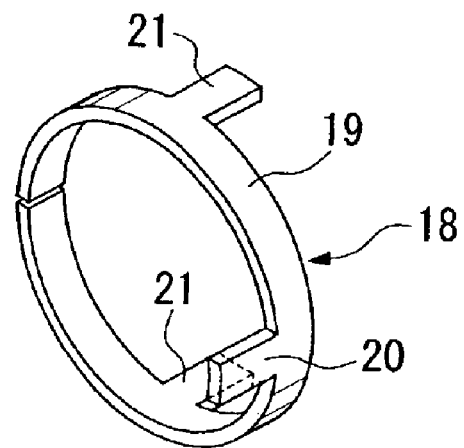
FIG. 8 is a perspective view of a key ring in the optical connector shown in FIG. 7.
Figure 9:
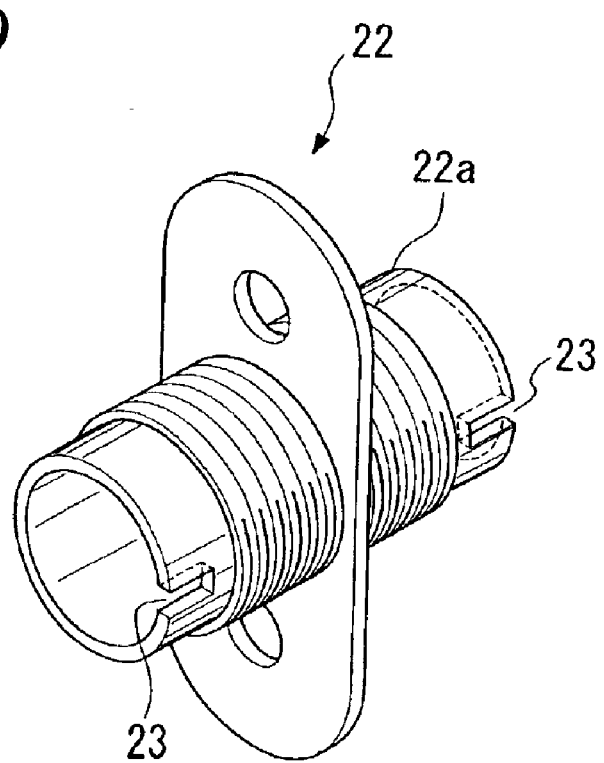
FIG. 9 is a perspective view of an optical connector adaptor.

Incidentally, the frame 34, which is inserted through the key ring 31, has substantially the same constitution as the frame 2 shown in FIG. 7, and differs only in not having the unillustrated engagement portions which engages to the projections 21 of the key ring 18 shown in FIG. 8. Even when the frame has this engagement portions, it does not cause any obstruction as long as the constitution allows the key ring 31 to stably rotate around the axis of the frame 34, and for this reason, it can be used as the frame 34 of the optical connector 30 of this invention.

The optical connector 30 can be connected to the optical connector adaptor 22 in the same manner as the conventional optical connector 1. Instead of the optical connector adaptor 22, the optical connector 30 can be connected to various other types of optical connectors (receive-side optical connectors, including the optical connector adaptor 22) such as, for example, an optical connector receptacle.

In the following, a case where the optical connector adaptor 22 is used as the receive-side optical connector and a pair of optical connectors 30 are connected with the optical connector adaptor 22 therebetween will be explained as an example. The optical connectors 30 are connected to each side of the sleeve section 22a in the same manner as the conventional optical connectors 1, thereby thrust-connecting the ferrules 8 of the optical connectors 30 in the optical connector adaptor 22 and optically connecting the optical fibers 35a (optical fibers exposed at the tips of optical fibers 35 comprising optical fiber cords; in this example, bare optical fibers) which are inserted in the ferrules 8. To position the optical connector 30 around the axis of the other ferrule which is thrust-connected to the ferrule 8 of the optical connector 30 (in other words, to position the optical connector 30 around the axis of the sleeve section 22a) the key 33 of the key ring 31, which is fastened to the outside of the frame 34, is inserted and engaged with the key groove 23 of the sleeve section 22a.

When using a receive-side optical connector other than the optical connector adaptor 22 (e.g. an optical connector receptacle or such like), the positioning of the optical connector 30 around the axis of the sleeve section 22a is achieved by inserting and engaging the key 33 of the key ring 31 of the optical connector 30 into a key groove in the receive-side optical connector, and the ferrule of the receive-side optical connector is thrust-connected to the ferrule of the optical connector 30.

During the assembly process of the optical connector 30, the center of the optical fiber 35a, which is inserted into the ferrule 8, can easily be centered with high precision by selecting the meshing grooves 10 of the flange section 9 which engages with the meshing pieces 11 of the frame 34 (reference numerals 9 through 11 are omitted in FIGS. 1 and 2), and by adjusting the fastening position of the key ring 31 in the direction running around the axis of the frame 34 (in other words, the peripheral direction). As a result, connection loss and the like can be reduced.

An example of a method for assembling the optical connector 30 will be explained in detail. Firstly, as in the conventional optical connector, a monitor device or the like is used to select a combination of the meshing pieces 11 of the frame 34 and the meshing grooves 10 of the flange section 9 which will reduce connection loss; these are then engaged together. Next, the key ring 31 is provided around the frame 34, and is rotated around the axis of the frame 34 on the outer peripheral face thereof while monitoring the positional relationship between the key 33 of the key ring 31 and the optical fiber 35 in the ferrule 8, until the key ring 31 is positioned at the best point for reducing connection loss. When the key ring 31 has been positioned, it is fastened to the frame 34.

A constitution such as that described above, which allows the center of the optical fiber 35a which is inserted into the ferrule 8, to be precisely positioned by selecting the meshing grooves 10 of the flange section 9 which engages with the meshing pieces 11 of the frame 34, and adjusting the fastening position of the key ring 31 by rotating it around the axis of the frame 34, enables the position of the optical fiber 35a to be minutely adjusted with respect to the frame 34, making it easier to achieve highly precise positioning and reduce connection loss and the like, than when centering the optical fiber 35a by selecting a combination for the meshing pieces 11 of the frame 34 and the meshing grooves 10 of the flange section 9.

Even in a case where the ferrule 8, the frame 34, the coupling nut 6, and such like, are assembled prior to attaching the key ring 31 to the frame 34, this type of optical connector 30 enables the optical fiber 35a to be centered and positioned around its axis (angular adjustment around its axis) with high precision, by rotating the key ring 31 around the frame 34.

Subsequently, the key as is an important factor of this invention, will be explained in detail.

Figure 3A:
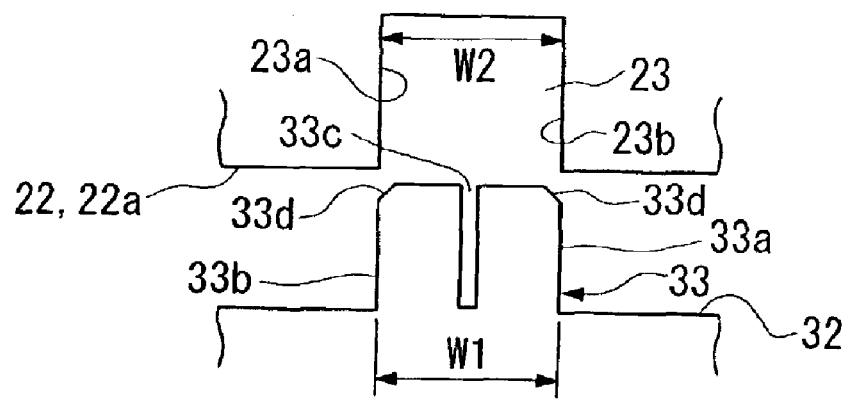
FIG. 3A is a diagram showing a key of the key ring shown in FIG. 2 and a key groove of an optical connector adaptor, and showing the state prior to insertion.
Figure 3B:
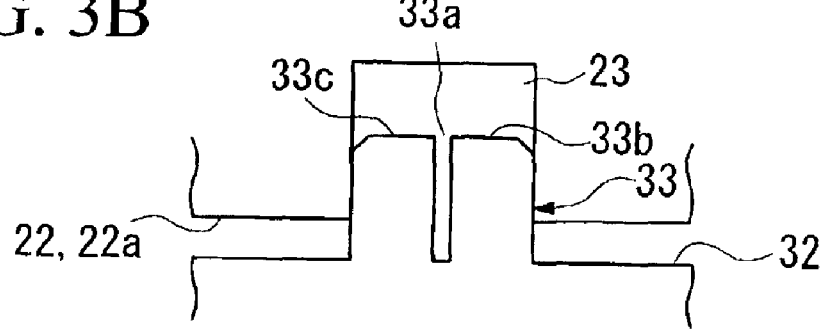
FIG. 3B is a diagram showing a key of the key ring shown in FIG. 2 and a key groove of an optical connector adaptor, and showing the state after insertion.

FIGS. 3A and 3B are diagrams showing the relationship between the key 33 and the key groove 23. FIG. 3A showing the state prior to insertion of the key 33 into the key groove 23, and FIG. 3B showing the state when the key 33 is inserted into the key groove 23.

The key 33 shown in FIGS. 3A and 3B comprises a pair of protruding pieces 33a and 33b, which protrude from the key ring main body 32. A slit-like clearance 33c (a space for deformation, hereinafter termed "slit") is maintained between the two protruding pieces 33a and 33b.

The dimension W1 in the width direction of the key 33 (hereinafter termed "width dimension W1"), that is, the distance between the side face of the protruding piece 33a on the opposite side to the slit 33c and the side face of the protruding piece 33b on the opposite side to the slit 33c, can be compressed by elastically deforming one or both of the protruding pieces 33a and 33b. The key 33 is inserted into the key groove 23 after matching the width direction of the key 33 (the direction which the width dimension W1 can be altered in) to the direction of the groove width W2 of the key groove 23 (on the left and right of FIGS. 3A and 3B; the direction along the peripheral direction of the sleeve section 22a).

The initial value of the width dimension W1 of the key 33 (the width dimension W1 when the protruding pieces 33a and 33b have not been elastically deformed, hereinafter sometimes abbreviated to "initial width dimension W1") should preferably be slightly greater than the groove width W2 of the key groove 23 (on condition that the groove width W2 of the key groove 23 is greater than the compression limit of the width dimension W1 of the key groove 23); when such a key 33 is inserted into the key groove 23, the pair of protruding pieces 33a and 33b elastically deform so as to make the slit 33c narrower and move closer together as they are pressingly inserted into the key groove 23. Consequently, the elastic restoring force presses the pair of protruding pieces 33a and 33b against the inner wall faces 23a and 23b on both sides in the groove width direction of the key groove 23, thereby preventing the key 33 from being unsteady in the key groove 23, and the insertion and meshing of the key groove 23 with the key 33 maintains stable positioning precision in the direction around the axis of the optical connector 30 with respect to the receive-side optical connector.

When the key 33 has a spring structure such as that described above, depending on the fluctuation range of the width dimension W1, difference between the initial width dimension W1 and the groove width W2 can be absorbed; therefore, provided that the size of the groove width W2 of the key groove 23 is greater than the compression limit of the width dimension W1 of the key 33 and smaller than the initial width dimension W1, the key 33 can be pressingly inserted into the key groove 23 in the same manner as already described, being held stably in the key groove 23 without any unsteadiness. As long as the difference between the initial width dimension W1 and the groove width can be absorbed by the fluctuation of the width dimension W1, the key 33 can be stably held in the key groove 23 as described above, without needing to select an optical connector which corresponds with differences in the groove width of the key groove depending on specifications of the type of ferrule being used. This achieves the excellent advantage of being more economical than when selecting optical connectors from among multiple types in order to deal with differences in the groove width.

Furthermore, as already mentioned, the key 33 has a simple constitution, comprising the pair of protruding pieces 33a and 3b which can be elastically deformed, and consequently has the advantage of lower cost than when the dimensions of the key and key groove are held to lower tolerances to preserve positioning precision.

In addition, since the constitution ensures that the key 33 is not unsteady in the key groove 23, even when the coupling nut 6 is rotated at the time of connecting and disconnecting the optical connector 30 to and from the optical connector adaptor 22, any follow-up rotation of the ferrule 8 will be prevented. Therefore, it is possible to prevent the tip of the optical fiber 35a and the ferrule 8 from being damaged as a result of follow-up rotation, and other undesirable consequences.

Although there are no limitations on the type of optical fiber 35 connected to the optical connector 30, the advantages of this invention are particularly successful when applied in the optical connection of polarization-maintaining and absorption-reducing fibers (PMF). The optical connector 30 of this invention can be minutely adjusted during centering by rotating the key ring 31, and, by pressingly inserting the key 33, which has an initial width dimension W1 slightly greater than the groove width W2 of the key groove 23, into the key groove 23, the key 33 can be stably held in the key groove 23 with no unsteadiness, making it possible to position the cores of the polarization-maintaining and absorption-reducing fibers with high precision, and thereby easily improve the connection.

In the followings, modifications of the specific shape of the key ring will be explained with reference to the figures. Each of the keys described below comprises a protruding piece, which protrudes from a key ring main body and is manufactured by machining the metal of the key ring; the key is inserted into the key groove 23 after aligning the width direction with the groove width W2 direction of the key groove 23. The key rings having a key in each of the following modifications differ from the key ring 31 already explained only in respect of the shape of the key, and are otherwise identical to the key ring 31.

-Modification 1-

Figure 4A:
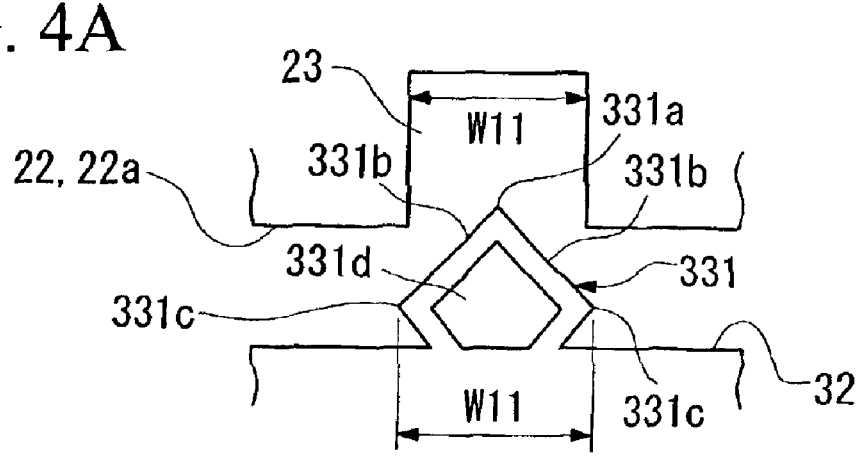
FIG. 4A is a diagram showing a modification of the key according to this invention, and showing the state prior to insertion.
Figure 4B:
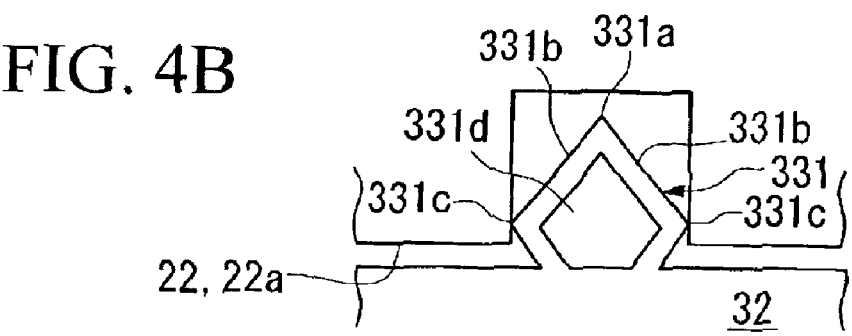
FIG. 4B is a diagram showing a modification of the key according to this invention, and showing the state after insertion.

The key 331 shown in FIGS. 4A and 4B is schematically a diamond-shaped frame. An insertion tip 331a of the key 331 which is initially inserted to the key groove 23 (shown in the top sections of FIGS. 4A and 4B; in other words, the tip protruding from the key ring main body 32) constitutes one apex of the diamond, and has a pointed shape. The insertion tip 331a and the key ring main body 32 are connected by a pair of spring sections 331b, each shaped like the symbol "<", and the bents (apices) 331c of the "<" shape of the spring sections 331b are positioned so as to constitute apices of a diamond (the apices on both sides of the insertion tip 331a).

The advantage of the pointed insertion tip 331a is, of course, that it allows the key 331 to be smoothly inserted into the key groove 23.

The distance between the bents 331c of the key 331 (width dimension W11) can be varied by the elastic deformation of the two spring sections 331b, provided at both sides with a space 331d (space for deformation) in the key 331.

The key 331 is inserted into the key groove 23 with its width direction (the direction which the width dimension W11) is variable in alignment with the direction of the groove width W2 of the key groove 23. When the width dimension W11 is slightly greater than the width dimension W2, the key 331 is pressingly inserted into the key groove 23 by elastic deformation, and is held stably therein with no unsteadiness, in the same way as the key 33 described above.

-Modification 2-

Figure 5:
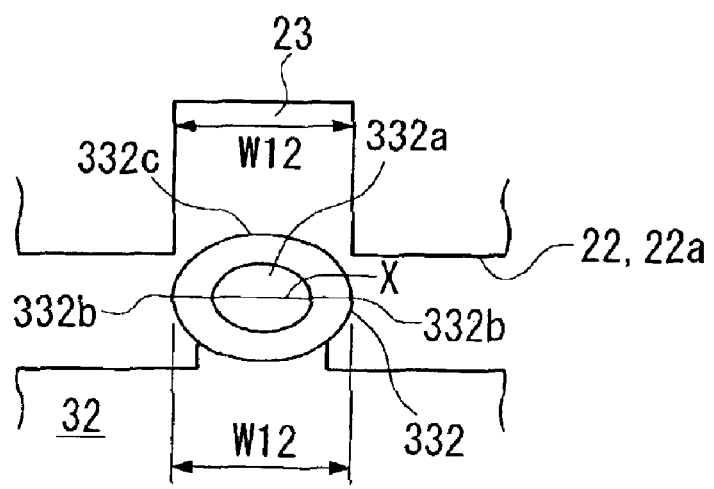
FIG. 5 is a diagram showing another modification of the key according to this invention.

The key 332 shown in FIG. 5 is schematically an oval-shaped frame. The distance (width dimension W12) between the sides (side sections 332b) of the key 332 can be varied by elastic deformation in a space 332a (space for deformation) in the oval-shaped frame, and the key 332 is inserted into the key groove 23 by aligning its width direction (the direction which the width dimension W12 is variable in) with the direction of the groove width W2 of the key groove 23. When the width dimension W12 is slightly greater than the width dimension W2, the key 332 is pressingly inserted into the key groove 23 by elastic deformation, and is held stably therein with no unsteadiness, in the same way as the key 33 described above.

In this key 332, since the region from the tip 332c which is initially inserted into the key groove 23, to the side sections 332b forms a tapered surface having the insertion tip 332c as its apex, the key 332 can be smoothly inserted into the key groove 23.

The key 332 shown in FIG. 5 has an oval shape with its long axis X parallel to the width direction. However, the shape is not limited to this, and various configurations are permissible, such as one where the direction of the long axis of the oval matches the direction which the key protrudes in from the key ring main body 32, or faces in another direction, and the like.

Furthermore, so long as the constitution that the dimension in the width direction to be varied by elastic deformation using a spring structure is employed, the specific shape of the key need not, of course, be limited to the shape mentioned in the embodiment described above, and may for example be circular, or any variety of shape.

Figure 6:
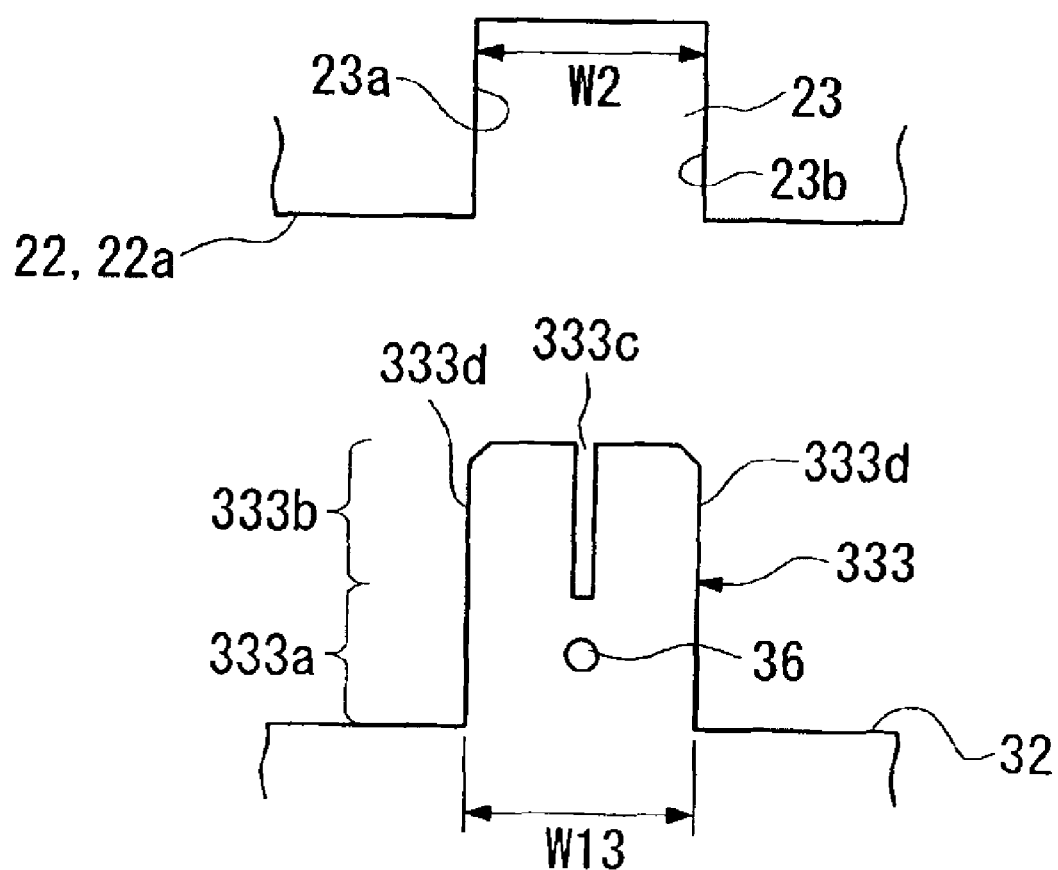
FIG. 6 is a diagram showing an example where an injection hole for adhesive is provided in the key of the key ring according to this invention.

In addition, it is preferable that an injection hole for adhesive is provided in the key of the key ring for improving workability when attaching the key ring to the frame after the positioning of the key ring around the axis of the frame. The key 333 shown in FIG. 6 is one example of this, and shows a protruding piece which protrudes from the key ring main body 32. The key 333 has a spring structure section 333b, which can be elastically deformed so as to vary its width dimension (width dimension W13) corresponding to the groove width direction of the key groove 23, and the spring structure section 333b is provided at the tip of a plate-like principal section 333a, extending from the key ring main body 332. An injection hole 36 is provided in the principal section 333a, and allows the injection of an adhesive for fastening the key ring having the key 333 to the frame 34. More specifically, in the example of FIG. 6, the extended section of the spring structure section 333b which extending from the tip of the principal section 333a, is divided in two by a slit 333c, and two protruding pieces 333d protrude in parallel from the tip of the principal section 333a. However, the constitution of the spring structure section 333b is not limited to this, and various other arrangements are acceptable.

When using a key ring in which the key of the key ring 31 shown in the example of FIG. 2 and the like has been altered to the key 333, after the key ring 31 has been provided around the frame 34 and positioned by rotating it around the axis of the frame 34, an adhesive is injected into the injection hole 36 and enables the key ring to be fastened to the frame 34. Injection of the adhesive into the injection hole 36 in the key 333 is more effective and workable than, for example, injecting the adhesive between the key ring main body 32 and the frame 34, and completely avoids any interference with the members around the frame 34, such as the coupling nut 6.

This invention is not limited to the embodiments described above, and can be modified in various ways. For example, the key ring of the key is not limited to one which can be positioned by rotating it around the axis of the frame, as described above, and may be, for example, a conventional key ring, or such like.

Furthermore, the key may be provided on a member other than a key ring. Various constitutions are acceptable, such as providing the key on the frame of the optical connector.

What is claimed is:

1. An optical connector comprising:

a cylindrical frame having a key provided thereon, and a ferrule which is positioned inside said frame for controllable axial rotation with respect to said frame; said frame and said ferrule being inserted into a receive-side optical connector, said key being inserted into and engaged with a key groove of said receive-side optical connector for connecting said optical connector to said receive-side optical connector and to position said optical connector around an axis of said receive-side optical connector; and said key having a spring structure which enables variation of a width of said key in a dimension corresponding to a width of said key groove by elastic deformation of said spring structure.

2. An optical connector according to claim 1, wherein said key has a protruding piece which protrudes from a key ring which extents around the frame.

3. An optical connector according to claim 2, wherein said key ring is rotatable around an axis of said frame for positioning of said key ring, and is fastened to said frame after the positioning of said key ring.

4. An optical connector according to claim 3, wherein an adhesive is provided for fastening said key ring to said frame.

5. An optical connector according to claim 4, wherein said key ring has an injection hole for inserting said adhesive between said key ring and said frame.

* * * * *